(12) United States Patent
Deschler et al.

(10) Patent No.: US 10,641,593 B2
(45) Date of Patent: May 5, 2020

(54) COMBINATION SENSOR

(71) Applicant: SCHLEUNIGER HOLDING AG, Thun (CH)

(72) Inventors: Raphael Deschler, Oberhofen (CH); Michael Jost, Thun (CH); Christian Huggler, Steffisburg (CH); Reto Hofer, Faulensee (CH)

(73) Assignee: SCHLEUNIGER HOLDING AG, Thun (CH)

( * ) Notice: Subject to any disclaimer, the term of this patent is extended or adjusted under 35 U.S.C. 154(b) by 61 days.

(21) Appl. No.: 16/089,725

(22) PCT Filed: Mar. 31, 2017

(86) PCT No.: PCT/IB2017/000372
§ 371 (c)(1),
(2) Date: Sep. 28, 2018

(87) PCT Pub. No.: WO2017/168237
PCT Pub. Date: Oct. 5, 2017

(65) Prior Publication Data
US 2019/0145750 A1    May 16, 2019

(30) Foreign Application Priority Data
Apr. 1, 2016   (EP) .................................. 16163593

(51) Int. Cl.
*G01B 7/02* (2006.01)
*G01B 11/10* (2006.01)
(Continued)

(52) U.S. Cl.
CPC .............. *G01B 7/023* (2013.01); *G01B 7/12* (2013.01); *G01B 7/125* (2013.01); *G01B 11/08* (2013.01);
(Continued)

(58) Field of Classification Search
CPC . G01B 7/00; G01B 7/02; G01B 7/023; G01B 7/026; G01B 7/04; G01B 7/046;
(Continued)

(56) References Cited

U.S. PATENT DOCUMENTS 3,818,390 A * 6/1974 Gikow .................... H03H 5/006
334/68
4,641,525 A * 2/1987 Merki ....................... G01B 7/06
73/865.8

(Continued)

FOREIGN PATENT DOCUMENTS

CN    87214470 U    5/1988
CN    1403821 A    3/2003
(Continued)

OTHER PUBLICATIONS

International Search Corresponding to PCT/IB2017/000355 dated Jun. 26, 2017.
(Continued)

*Primary Examiner* — Hoai-An D. Nguyen
(74) *Attorney, Agent, or Firm* — Davis & Bujold PLLC; Michael J. Bujold (57) ABSTRACT

An assembly for automatically detecting contactlessly elongate objects (W). The assembly comprises an inductive measuring system (E) and a first optical measuring system (D) for the object (W) within a housing (2). The inductive measuring system (E) is an eddy current sensor for determining an electromagnetic characteristic of the object (W) and has half coils (E1$a$, E1$b$) which wind around the object (W) and forms an inductive cylindrical measurement volume (Ev). The half coils (E1$a$, E1$b$), together with a capacitor (E2), form a parallel oscillating circuit (E6), which is connected to an electronic evaluating circuit (E5). The first optical measuring system (D) determines the outside diameter (Wdo) of the object (W) and an optical disk-shaped (Continued)

measurement volume (DCPv) is formed between the two half coils (E1*a*, E1*b*). Optionally, the assembly, by a second optical measuring system (C), determines the color and the position by a third virtual measuring system (P).

21 Claims, 9 Drawing Sheets

(51) Int. Cl.
*G01B 7/12* (2006.01)
*G01N 21/952* (2006.01)
*G01J 3/50* (2006.01)
*G01B 11/08* (2006.01)

(52) U.S. Cl.
CPC ............ *G01B 11/10* (2013.01); *G01J 3/501* (2013.01); *G01N 21/952* (2013.01)

(58) Field of Classification Search
CPC .......... G01B 7/048; G01B 7/12; G01B 7/125; G01B 7/14; G01B 11/00; G01B 11/08; G01B 11/10; G01B 11/14; G01J 3/00; G01J 3/46; G01J 3/50; G01J 3/501; G01N 21/00; G01N 21/84; G01N 21/88; G01N 21/95; G01N 21/952; G01N 33/00; G01N 33/36; G01N 33/365
USPC ....... 324/600, 635, 644, 649, 654, 658, 661, 324/662, 699, 200, 207.11, 207.13, 324/207.15, 76.11, 76.39, 76.75; 356/72, 356/73.1, 429, 625, 630, 634, 635, 636, 356/637, 638
See application file for complete search history.

(56) References Cited

U.S. PATENT DOCUMENTS

| | | | |
|---|---|---|---|
| 6,449,345 B1 | 9/2002 | Grimes | |
| 6,459,494 B1* | 10/2002 | Kurokawa | ............ G01B 11/046 356/429 |
| 7,068,359 B2* | 6/2006 | Studer | ................... G01B 7/023 356/73.1 |
| 9,733,231 B2* | 8/2017 | Reitsma | ............... G01N 33/483 |
| 2003/0107729 A1 | 6/2003 | Furter | |
| 2003/0205088 A1* | 11/2003 | Passarelli, Jr. | ....... G01N 29/223 73/643 |
| 2005/0213113 A1 | 9/2005 | Sikora et al. | |
| 2009/0103111 A1 | 4/2009 | Spalding | |
| 2011/0299095 A1 | 12/2011 | Morgan et al. | |

FOREIGN PATENT DOCUMENTS

| | | |
|---|---|---|
| DE | 100 03 717 A1 | 7/2001 |
| DE | 102 19 848 A1 | 10/2003 |
| DE | 10 2006 010 992 A1 | 9/2007 |
| EP | 0 692 697 A2 | 1/1996 |
| GB | 2 160 654 A | 12/1985 |
| JP | 2000-0161985 A | 6/2000 |
| WO | 2009/150620 A1 | 12/2009 |

OTHER PUBLICATIONS

International Search Corresponding to PCT/IB2017/000372 dated Jun. 26, 2017.
Written Opinion Corresponding to PCT/IB2017/000355 dated Jun. 26, 2017.
Written Opinion orresponding to PCT/IB2017/000372 dated Jun. 26, 2017.

* cited by examiner

COMBINATION SENSOR

This application is a National Stage completion of PCT/IB2017/000372 filed Mar. 31, 2017, which claims priority from European patent application serial no. 16163593.3 filed Apr. 1, 2016.

FIELD OF THE INVENTION

The invention relates to an arrangement for automatically detecting elongate objects such as cables, wires or profiles using at least one inductive measuring system and at least one optical measuring system for the object in a common housing and an installation.

BACKGROUND OF THE INVENTION

In processing machines for cable, wires or similar elongate objects, it must be ensured by reliable identification of the objects that the type of processing, the settings of the machine and their parameters are tuned to the respective object and the requirements defined by the user. To this end measuring systems are preferably arranged in front of or at the input of the processing machine, which should enable a reliable identification of the elongate object. These comprise a plurality of sensor arrangements since the reliability of the identification increases with the number of different measurement principles (because, for example, cable having the same outside diameter and the same colour can have different internal conducting configurations or cable having a different structure—fine braid, braid, wire—with a different copper cross-section can have the same electromagnetic characteristics).

DE10219848A1 discloses a contactless centricity and diameter measuring system comprising an optical measuring device for determining the outside diameter and the position of an elongate object in an optical measurement plane arranged perpendicular and transversely to the central axis of a measuring device. The object comprises a conductor and a sheath which insulates this, wherein the position of the conductor in an inductive measurement plane is determined by means of an inductive measuring coil device, which measurement plane is also arranged perpendicular and transverse to the central axis of the measuring device. The position of the object determined by the optical measuring device is related to the position of the conductor determined by the inductive measuring coil device and from this the centricity of the conductor in the sheath is calculated. In this case the measuring coils of the measuring coil device are arranged in pairs or equally in relation to the optical measurement plane but are not traversed by the elongate object. The measurement object itself always remains outside the measuring coils. The pairwise arrangement of coils is used for differential measurement of the field strength, starting from the alternating current flowing in the conductor, which must be induced by means of an additional inductor of the measuring system in the conductor. Thus, the difference of the voltages induced in the coils is a measure of the eccentricity of the conductor in relation to the coil mirror axis. The coils are therefore not part of a resonant circuit which is damped by the copper. Furthermore, no further optical measuring system is provided.

WO2009150620A1 in turn describes an arrangement of sensors, which as a result of measurements of the outside diameter of a cable, the diameter of the metallic conductor lying inside the insulating sheath and optionally other externally detectable features allows an automatic or semi-automatic identification of the respective cable provided for processing, or at least the cable type. The various said sensors are functionally independent of one another, have no synergistic effects, have no jointly used elements or areas and therefore do not form a combination of measuring systems.

SUMMARY OF THE INVENTION

It is the object of the present invention to provide an improved sensor arrangement which uses synergies of various measuring systems so that a compact, functionally robust design of a combination sensor is obtained which enables the determination of several characteristics of the object in order to enable a rapid and reliable identification of the object to be made from this.

In order to solve this object, the initially described arrangement is characterized in that the inductive measuring system is designed as an eddy current sensor for determining an electromagnetic characteristic of the object and comprises two series-connected, coaxial half-coils which are oriented in the same direction, which have a distance from one another in the axial direction, which wind around the object coaxially to the longitudinal axis, so that the interior thereof defines an inductive cylindrical measurement volume, wherein the half-coils together with an electrically parallel connected capacitor form a parallel resonant circuit used as inductive sensor of the inductive measuring system, which is connected to an electronic evaluation circuit. In addition, the arrangement is characterized in that in this at least one first optical measuring system is formed to determine the outside diameter of the object, wherein an optical disk-shaped measurement volume is defined by the spacing of the half-coils and the inner wall of the housing and is arranged inside the inductive cylindrical measurement volume. Thus, various measured values and characteristics of the object can be detected by means of a relatively compact arrangement in order to allow its rapid identification with high reliability. Via the gap formed by the spacing of the half-coils, the elongate object is easily accessible for at least the optical diameter measurement, for any colour measurements and possibly further optical measurements and also measurements based on further measurement principles in addition to the inductive measurements.

Preferably the length of a half-coil is at least half as great as the diameter thereof, with the result that the housing of the coil or the half-coils brings about an optical shadowing of the optical measurement volume with respect to external light. Thus, the measurement accuracy of the diameter determination and colour identification is improved. The measurement of the conductor cross-section also becomes more accurate with increasing length of the coil since the longer the coil, the more homogeneous is its magnetic field over the cross-section. The optional feature that the inductive cylindrical measurement volume is preferably restricted by cable jacks and further preferably radially also contributes to this. With increasing coil length, the dependence of the measurement result for the instantaneous cable location inside the coil therefore decreases. Accordingly, with increasing length of the inductive measurement volume in the axial direction of the object to be identified, the measurement accuracy of all the measuring systems increases whether these are now inductive or purely optical measurements.

A further advantageous embodiment of the arrangement according to the invention is further characterized in that in that the parallel resonant circuit of the inductive measuring system is connected to an exciter circuit, preferably operated at its natural frequency, and is connected to an electronic circuit for measuring the voltage amplitude.

An alternative embodiment to this provides that the parallel resonant circuit of the inductive measuring system forms with a frequency generator a parallel resonant circuit used as inductive sensor of the inductive measuring system, which is connected to an electronic circuit for measuring the amplitude response and/or the phase response.

Preferably the optical disk-shaped measurement volume of the first measuring system is positioned in the longitudinal direction centrally and preferably coaxially to the inductive cylindrical measurement volume embracing the object. The region of the optical measurement is therefore optimally shielded from both sides with respect to interfering light from outside.

Advantageously the first optical measuring system comprises at least one first illumination arrangement having at least one first light source and preferably a screen as well as a first sensor array positioned on the other side of the half-coils on the principal axis. This arrangement enables a very accurate determination of the diameter of the elongate object in a relatively simple constructive design using conventional and proven components. In addition, the light source can advantageously illuminate the object through the gap in the housing, between the half-coils and the cable jacks, whose shadowing is also incident through this gap on the first sensor array and can be detected there. Preferably a linear sensor array is provided for this.

A further advantageous embodiment of the invention is characterized in that at least a second optical measuring system is configured for determining the colour of the object. Since cable types are frequently characterized, for example, by the colours of their sheathing, such a sensor arrangement allows a rapid and very reliable identification of the cable type.

Preferably this second optical measuring system comprises a second illumination arrangement comprising a plurality of, preferably three and also preferably placed close to one another, light sources having different wavelength spectra as well as at least one second sensor array for the light reflected from the object, wherein this lies in relation to the x-z plane on the same side of the disk-shaped measurement volume as the second illumination arrangement. These light sources are preferably placed such and their light cones are formed with a screen such that their light is not incident on the sensor housing but only on the object to be measured.

Preferably a sequence is implemented in the second optical measuring system to drive the light sources of the second illumination arrangement in such a manner so that the object is sequentially illuminated and thus sequential images in the wavelength spectra of the light sources of the second illumination arrangement are projected onto the second sensor array. This second sensor array is for its part connected to an evaluation unit for the intensities measured during the illumination with the second illumination arrangement having different wavelength spectra and for the ensuing determination of the colour of the object.

An advantageous embodiment of this arrangement is characterized according to the invention in that a reflecting long-pass filter is arranged on the principal axis of the optical measuring systems, which is reflecting for the wavelength spectra of the second illumination arrangement and transmitting to that of the first and which deflects the light reflected by the object onto the second sensor array positioned outside the principal optical axis and aligned onto the long-pass filter for detection of the colour.

A further advantageous embodiment of the invention provides that a lens is arranged between the disk-shaped measurement volume and the long-pass filter, which is passed once as a collimating lens by the light of the first illumination arrangement and also twice as an imaging lens by the light of the second illumination arrangement reflected by the object. As a result of this quasi-coaxial arrangement, the collimating arrangement of the diameter measurement can also be used as imaging lens for the measuring arrangement for the colour of the elongate object, with the result that a simpler and more compact design of the overall arrangement and a saving of the required components is possible.

Preferably according to the present invention, the optical measuring systems for determining the diameter and the colour are combined to form a third virtual measuring system for determining the position of the object inside the disk-shaped measurement volume. The individual optical measurements and the inductive measurement can thus be corrected by incorporating the position information for the object in order to obtain more accurate measurement results.

Preferably the principal plane of the optical measuring systems is arranged with the principal optical axis perpendicular to the longitudinal axis of the inductive measurement volume.

An advantageous arrangement according to the invention further provides that the third measuring system for determining the position comprises a third illumination arrangement with preferably two light sources, the first sensor array and optionally the first illumination arrangement for triangulatory determination of the position of the object (W) inside the measurement volume (DCPv).

An alternative embodiment for the second illumination arrangement is that in which the light sources of the third illumination arrangement comprise a plurality of light sources each having different wavelength spectra and designed to illuminate the object sequentially and thus sequentially project an image in the wavelength spectra of the light sources onto the second sensor array.

Common to all the arrangements is the advantageous feature of the invention that the measurement plane of the second sensor array for determining diameter runs perpendicular to the x-y plane but intersects this at a small angle $\alpha$ to the x axis. This is particularly important if the two locations of the light sources for determining position are also used as locations for light sources for determining colour.

An alternative embodiment can be characterized in that the second sensor array is a multichromatic sensor and the light sources of the second illumination arrangement are operated simultaneously or are replaced by a wide-band or multiband light source.

Alternatively or additionally it can also be provided for this purpose that the second sensor array is a multichromatic sensor and at least one of the light sources of the second illumination arrangement is replaced by a wide-band or multiband light source.

Advantageously the arrangement can also be provided with a temperature sensor for correction of the temperature-induced measurement errors.

In this case, a correction sequence is preferably implemented in the inductive measuring system in order to provide its measured value with a correction factor as a function of temperature and with a correction factor as a function of the cable location.

In order to make the cable identification even more informative or clearer, if necessary further measuring systems can additionally be included using measurement methods different from the measurement principles described above. It is thus feasible to expand the idea according to the invention so that a measuring system for determining the diameter of an electrical conductor is provided inside the object based on a mechanical measurement, preferably a blade distance measurement at the time of a blade-conductor contact.

In order to solve the initially formulated object, an installation for processing elongate objects such as cables, wires or profiles is also provided with an input-side supply for the elongate objects coaxially to the longitudinal extension thereof. According to the invention, an arrangement for automatic detection is provided as described in the preceding paragraphs, whose measurement volume preferably extends coaxially to the supply of the installation for the elongate objects.

Further advantages, features and details of the invention are obtained from the following description in which exemplary embodiments of the invention are described with reference to the drawings. In this context, the features mentioned in the claims and in the description are each essential to the invention individually for themselves or in any combination.

The technical content of the patent claims and figures is part of the disclosure. The figures are described in a cohesive and overlapping manner. The same reference numbers mean the same components, the same reference numbers with different indices specify functionally the same or similar components.

DETAILED DESCRIPTION OF THE PREFERRED EMBODIMENTS

Figure 1:
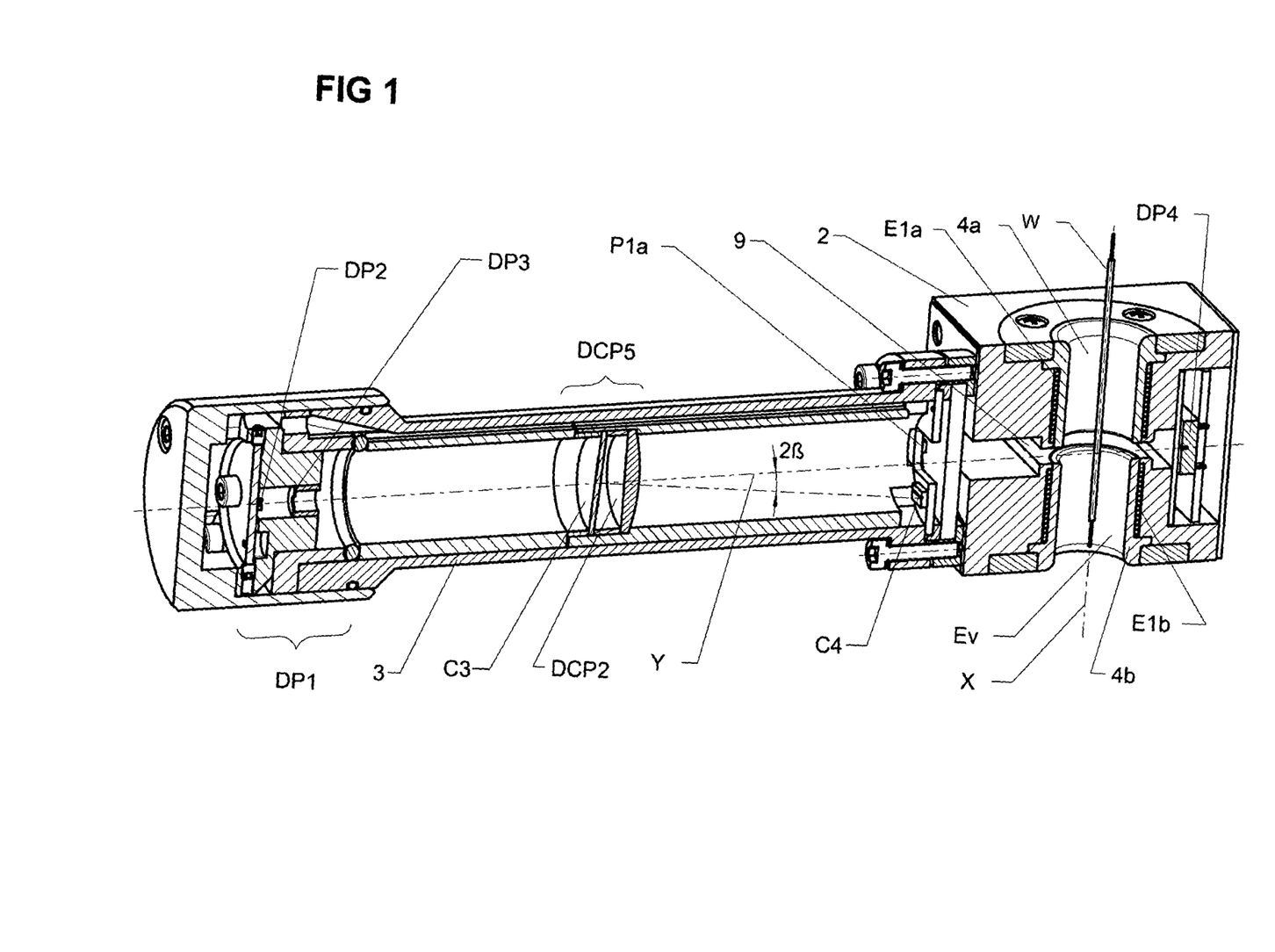
FIG. 1 shows a longitudinal section in the x-y plane through an exemplary sensor arrangement according to the invention for a cable processing machine.

FIG. 1 shows an exemplary embodiment of a sensor arrangement such as is preferably positioned in front of or at the input of a processing machine for elongate objects, in particular for processing machines for cable or the like in order to enable a reliable identification of the cable to be processed as measurement object W. On the input side a housing 2 as well as a tube 3 with a part of the optical system of the sensor arrangement are fastened on the processing machine. The elongate object W is guided in the axial direction through the cable jacks 4a, 4b in the housing 2.

During the through-movement of the object W or also during a standstill time, an electromagnetic characteristic is measured using a first measuring system E, from which further preferably the cross-section of the conducting component of the object W, in particular the cross-section of the conductor or conductors of a cable can be determined. Shortly before, thereafter or even at least partially at the same time the diameter is determined using the optical measuring system D and optionally the colour using the optical measuring system C and optionally the position of the object inside the cable jack using the measuring system P. The sensors for determining these measured quantities are based according to the invention on different measurement principles but at least partially use joint areas or elements of the sensor arrangement.

FIG. 1 shows a section through the sensor arrangement in the plane which is defined by the optic axis y and the axis x of the cable jacks 4a and 4b. Positioned at the outermost end of the tube 3 is a first illumination arrangement DP1 of the first optical measuring system D for determining the diameter with its light source DP2 and the screen DP3. The first optical measuring system D can also be part of another optical measuring system P for determining the position of the object W. An imaging optical system DCP5 is installed between the object W and this first illumination arrangement DP1, of which the long-pass filter C3, which acts as a mirror for visible light, reflects the light reflected by the object W and directs it onto a second sensor array C4 of the measuring system C for detecting the colour of the object W.

The half-coils E1a, E1b for an eddy current sensor as a preferred variant of an inductive measuring system E for determining the cross-section of the conductor—as an example for an electromagnetic characteristic—of the object W are accommodated between the cable jacks 4a and 4b and the housing 2. Preferably the overall length of both coils E1a, E1b is at least as large as their diameter.

Figure 2:
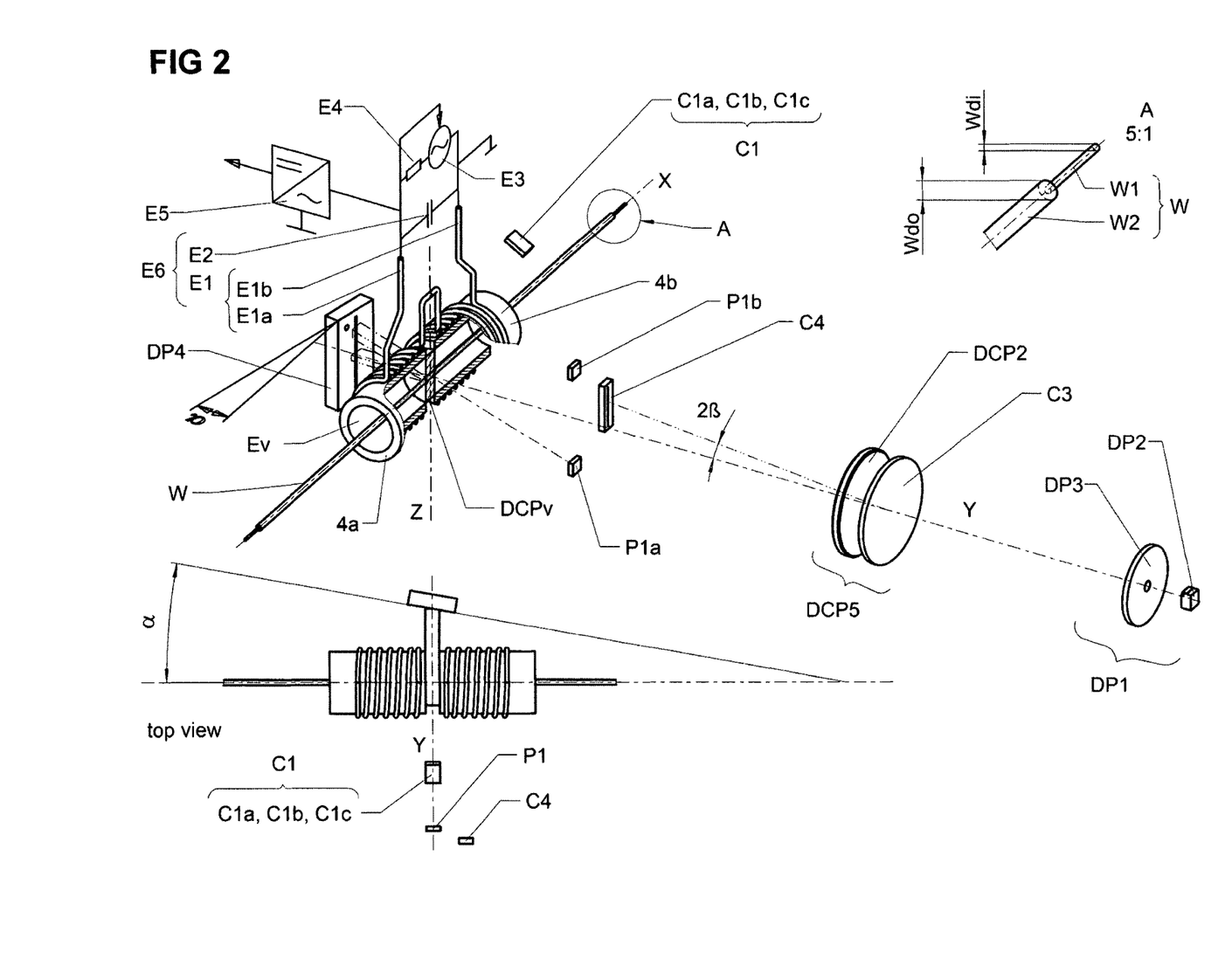
FIG. 2 shows a schematic diagram of the measuring systems of the arrangement from FIG. 1.

As can be seen in FIG. 2, the cable guide opening of the cable jacks 4a, 4b within the coil E1 formed by the two half-coils E1a, E1b forms the inductive cylindrical measurement volume Ev, wherein for the case of coils E1a, E1b and/or cable jacks 4a, 4b having differing circumferential shape, differing geometrical shapes for the measurement volume Ev can also occur. In particular the housing 2 accommodates a detector for the optical measuring system D for determining the diameter, in particular a first sensor array DP4. Preferably this first sensor array DP4 is designed as a linear sensor array.

Figure 3:
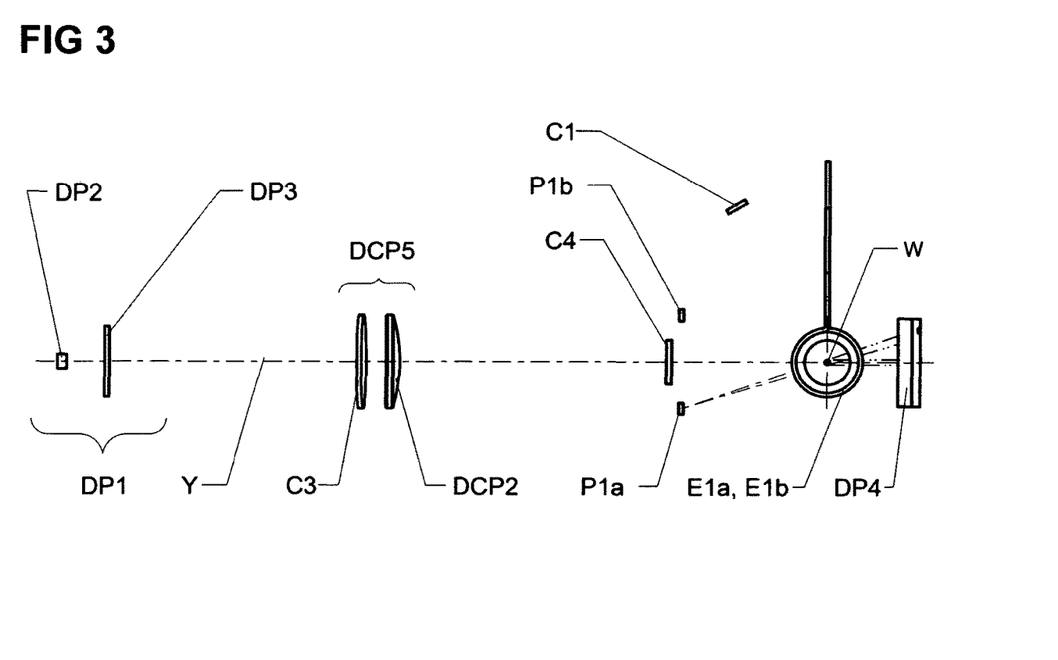
FIG. 3 shows a schematic view in the y-z plane of the measuring systems according to FIG. 1.

The essential elements of the measuring systems E, D, C, P are shown again schematically and in their advantageous mutual arrangement in FIGS. 2 and 3 and will be explained in detail hereinafter.

Figure 4:
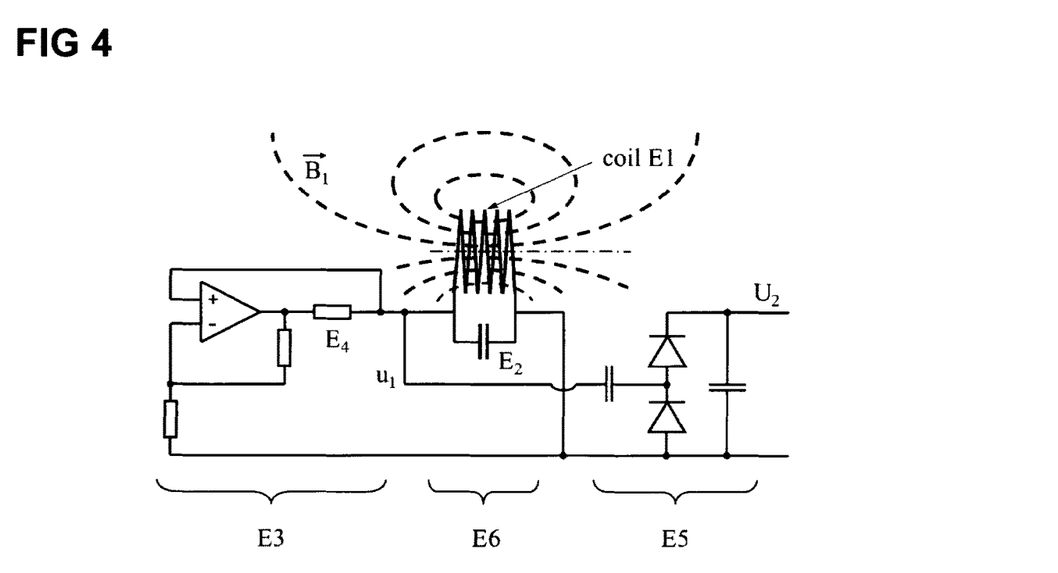
FIG. 4 shows a simplified electrical diagram of an eddy current sensor.

The eddy current sensor as inductive measuring system E comprises the two coaxial half-coils E1a, E1b which are connected in series to form a complete coil E1 and oriented in the same direction, which form a parallel resonant circuit with the capacitance connected in parallel thereto. This resonant circuit E6 is excited via the exciter circuit E3 and is used as inductive sensor of the inductive measuring system E, which is preferably operated at its natural frequency and is connected to an electronic circuit E5 for measuring the voltage amplitude. An alternative embodiment provides a frequency generator instead of an exciter circuit E3. In this case, the electronic circuit E5 is designed to measure the amplitude response and/or the phase response. The exciter circuit E3 can also comprise a separate output resistance E4 or can be constructed in such a manner that the effect of an output resistance is achieved. The parallel resonant circuit E6 is, as shown simplified and schematically in FIG. 4, at least connected to an exciter circuit E3 and also a rectifier circuit E5.

Figure 5:
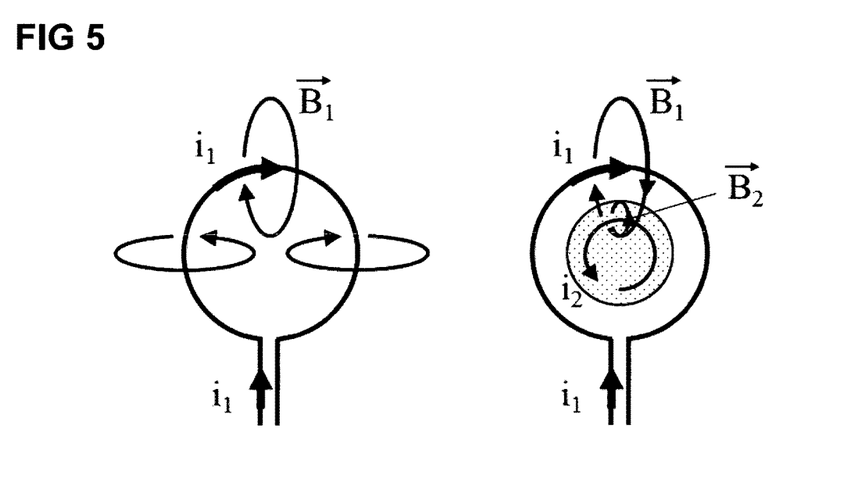
FIG. 5 shows the formation of the eddy current flow in the cable cross-section.

FIG. 5 shows the formation of the eddy current flow in the cable cross-section: if an electrical conductor W1—here the conductor of the object W—is brought into the oscillating magnetic field B1 of the coil E1—here symbolized by a single turn—an eddy current i2 is produced in this conductor W1, which in turn generates a magnetic field B2 which is in the opposite direction to the primary magnetic field B1 and attempts to raise this in the electrical conductor W1. Together with the Ohmic resistance of the conductor W1, the current flow i2 brings about power losses which have a damping effect on the LC resonant circuit E6. This damping is dependent on the form type, size and temperature of the electrical conductor W1, but also on the frequency of the magnetic alternating field. If the LC resonant circuit E6 is damped by an electrical conductor W1 in the coil E1, this damping can be measured as a reduction in the rectified resonant circuit voltage U2.

Figure 6:
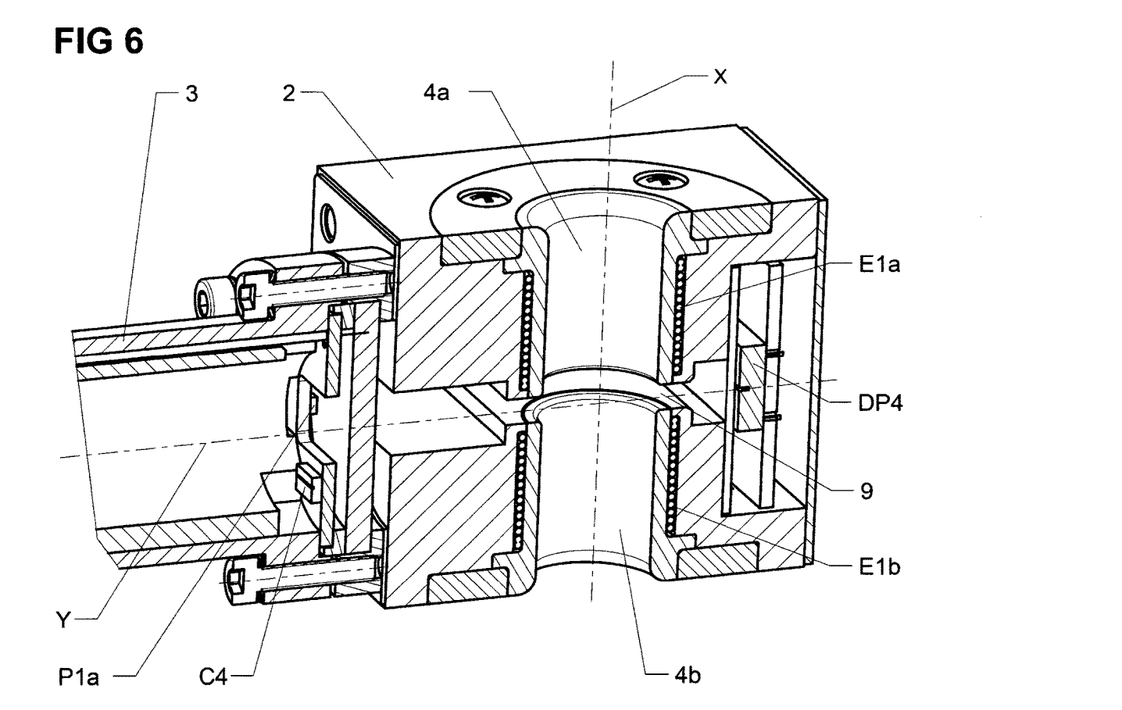
FIG. 6 shows a section in the x-y plane through an eddy current sensor according to the invention.
Figure 7:
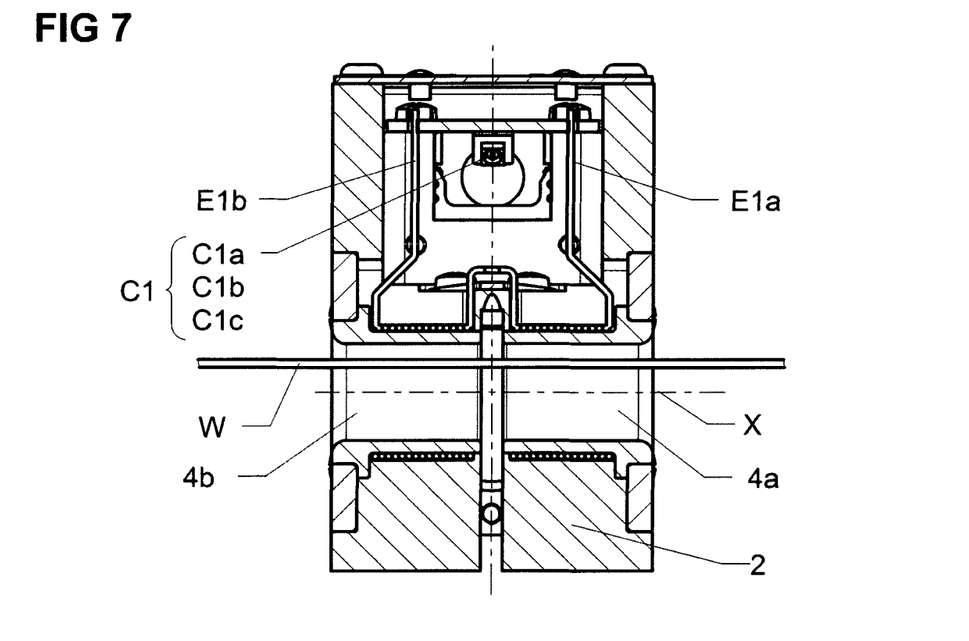
FIG. 7 shows a section in the x-z plane through an eddy current sensor according to the invention.

FIG. 6 and FIG. 7 show in enlarged scale orthogonal sections through the housing 2 and the coil arrangement E1a, E1b of the eddy current sensor of the inductive measuring system E. The two cable jacks 4a, 4b with the half-coils E1a, E1b are slightly spaced apart from one another in the axial direction which results in a gap 9 between these two components, which is continued in the housing 2 and enables access to the object W inside the cable jacks 4a, 4b for the optical measuring systems D, C, P. The common partial volume obtained due to gap 9 and the cable guide opening forms the schematic optical measurement volume DCPv. It further follows from FIG. 2 that preferably the principal plane y-z of the optical measuring systems D, C, P in which the principal optical axis y lies is oriented perpendicular to the longitudinal axis x of the inductive measurement volume Ev.

The narrower the coil gap 9 in relation to the diameter of the coils E1a, E1b, the less the magnetic field homogeneity is influenced and the longer are the two coils E1a, E1b, the more homogeneously the magnetic field is distributed over the coil cross-section. The magnetic field homogeneity is important for a position-independent conductor cross-section measurement. In the same way as the minimal coil lengths are related to the diameter, the cable jacks 4a, 4b have the task of keeping the magnetic field in the measurement volume Ev as homogeneous as possible by excluding the near-turn region of the coil cross-section with increased magnetic flux density from the measurement volume Ev.

Figure 8:
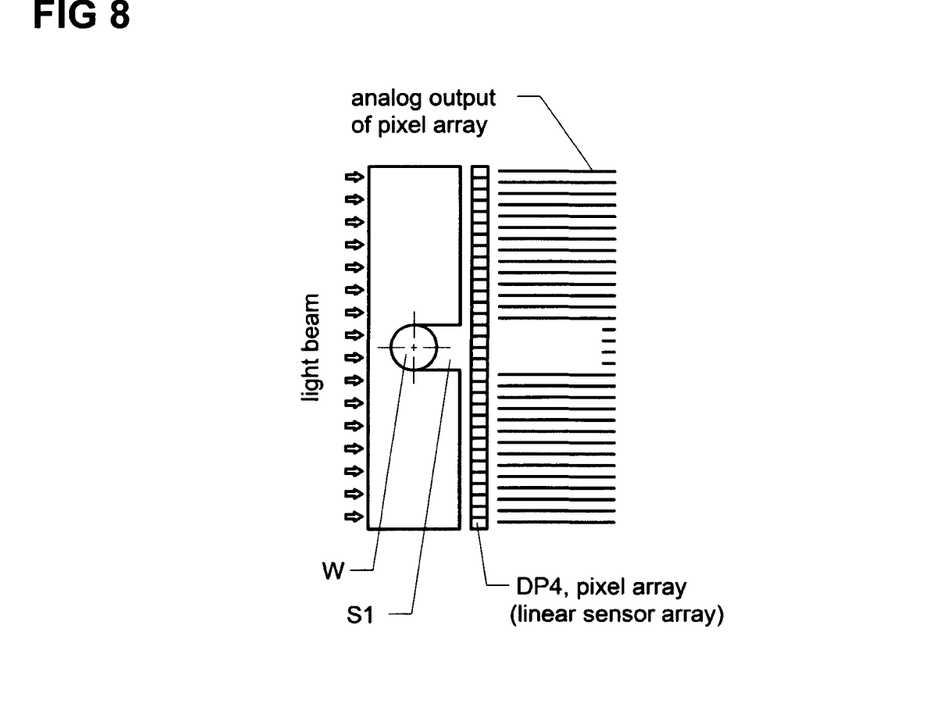
FIG. 8 shows schematically the functional diagram of a sensor arrangement according to the invention for determining the diameter of a cable.
Figure 9:
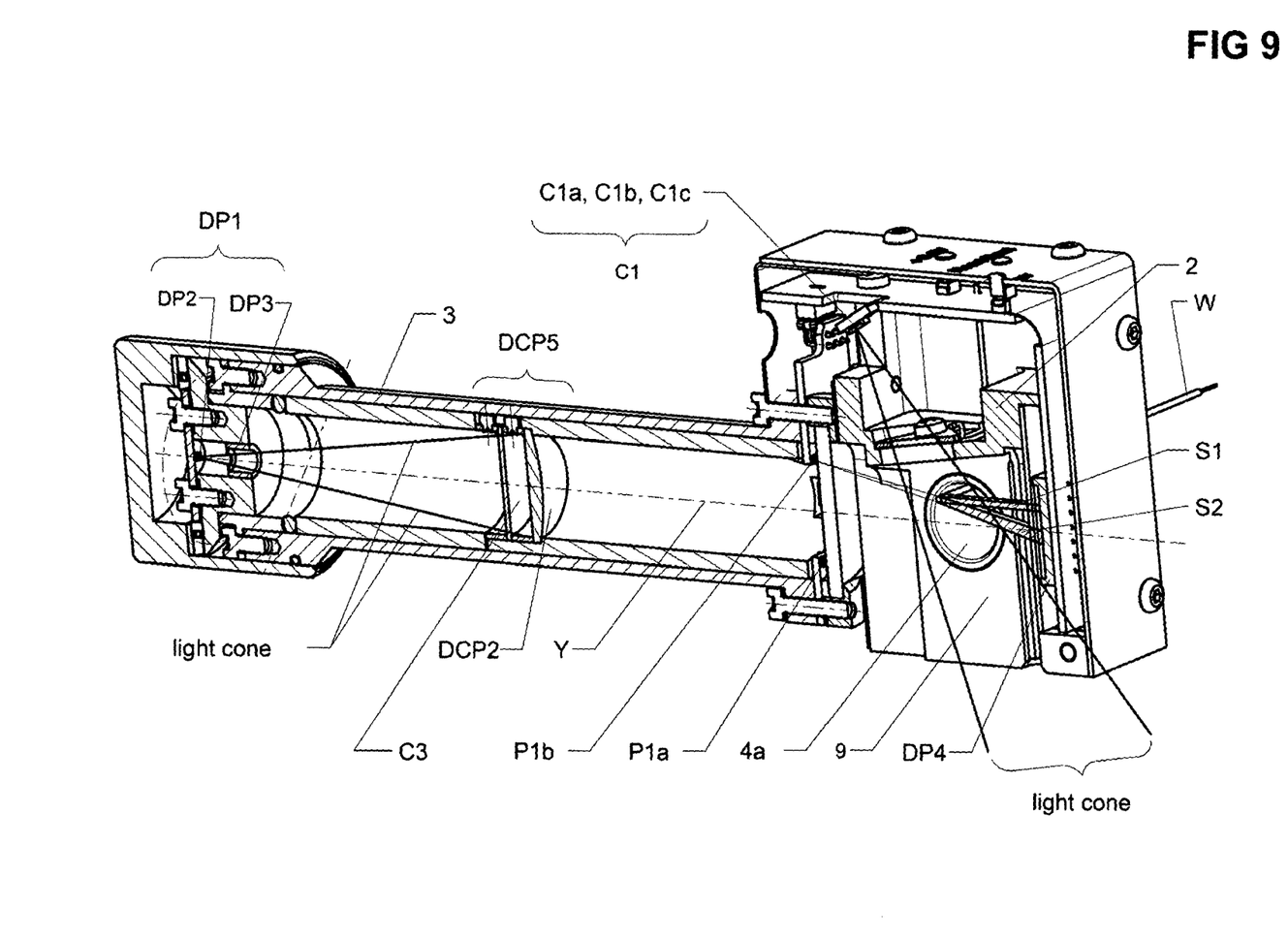
FIG. 9 shows a longitudinal section in the y-z plane through a sensor arrangement according to the invention along the optic axis.

For optical measurement of the outside diameter of the object W this is illuminated inside the cable jack 4a, 4b in the area of the optical measurement volume DCPv through the gap 9. As is shown clearly in FIG. 9, the light of the first illumination arrangement DP1 is collimated by the optical system DCP5 of the first optical measuring system D, impinges upon the object W and causes a shadowing symbolized by S1. As is depicted schematically in FIG. 8, this shadowing S1 causes different voltage levels for each pixel on the first sensor array DP4, from the distribution of which the cable diameter can be concluded. Advantageously the measurement plane of the first sensor array DP4, in particular in the advantageous design as a linear sensor array, runs perpendicular to the x-y plane but can intersect this at a small angle α to the x-axis (see FIG. 2).

The parallelism of the light and the pixel width of the sensor DP4 are crucial for the accuracy of the measurement. The light of the first illumination device DP1 with light source DP2, preferably designed as infrared LED, is collimated by the lens DCP2 whilst it passes unchanged through the long-pass filter C3. For other wavelengths, in particular in the wavelength range of the visible light, however the long-pass filter C3 behaves as a mirror.

The disk-shaped optical measurement volume DCPv is used for determining the diameter and optionally for detecting the colour of the object W. The second optical measuring system C provided for this purpose comprises, as can be deduced from FIGS. 2 and 3, a second illumination arrangement C1 having a plurality of light sources C1a, C1b, C1c placed close to one another having different wavelength spectra. Preferably three light sources are provided. The light sources are, for example designed as coloured LEDs (e.g. RGB-LEDs).

In this case, a sequence is implemented in the second optical measuring system C, for example as an executable program in a control and evaluation unit of this measurement system, by means of which the light sources C1a, C1b, C1c of the second illumination arrangement C1 are driven in such a manner in order to sequentially illuminate the object W and therefore sequentially project an image in the wavelength spectra of the light sources onto a second sensor array C4 of this measurement system C. In the evaluation unit of the optical measurement system C for determining colour the intensities measured during illumination of the object W using the light sources having different wavelength spectra are used for determining the colour of the object W. The second sensor array C4 is located see on this matter FIG. 1 and FIG. 2—in relation to the x-y plane on the same side of the disk-shaped measurement volume DCPv as the second illumination arrangement C1. Alternatively to the second sensor array C4, which is sensitive for the wavelengths of all three light sources of the second illumination arrangement, a multichromatic sensor consisting of three sensors sensitive for respectively different wavelengths could be provided.

The long-pass filter C3 positioned on the principal axis y of the optical measurement systems D, C, P is reflecting for the wavelengths of the light sources C1a, C1b and C1c of the second illumination arrangement C1 and thereby reflects the light reflected from the object W onto the second sensor array C4 positioned outside the principal optical axis y. The long-pass filter C3 is therefore penetrated by the light of the first illumination arrangement DP1 which then passes through the lens DCP2 and is thereby collimated. Light of the second illumination arrangement C1 then passes twice through the lens DCP2—after reflection by the object W and also after reflection at the long-pass filter C3—so that its refractive power is used twice and the imaging focal width is almost halved. The image is therefore formed somewhat laterally of the optic axis y so that the second sensor array C4 does not disturb the beam path, if the solder of the long-pass filter C3 reflecting in the second measurement system C is arranged in the x-y plane at a small angle β to the principal optical axis y.

Figure 10:
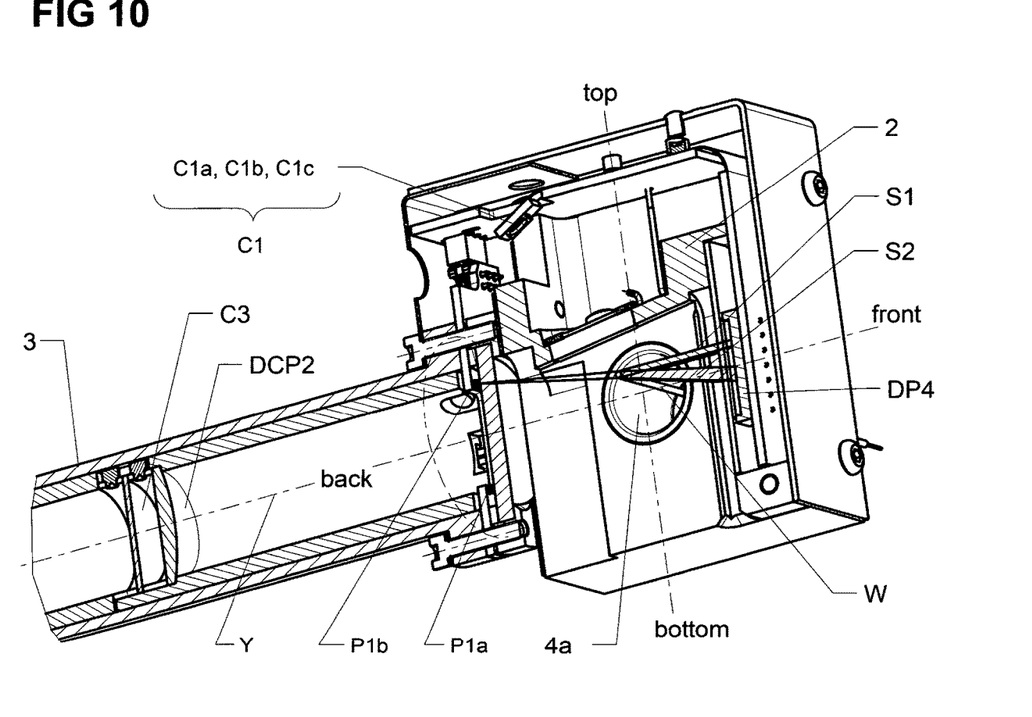
FIG. 10 shows another longitudinal section in the y-z plane through the sensor arrangement.

In order to determine the cable colour, preferably three images are made sequentially by means of the second sensor array C4 by means of respectively different illumination, for example under red, green and blue light. The colour of the object W can then be calculated in the evaluation unit through the projected colour intensities. It should be noted here that the colour intensity measured by the second sensor array C4 decreases quadratically with respect to the distance between the light sources and the object W and quadratically with respect to the distance between object W and the second sensor array C4. This cable location dependence can for example be corrected with adapted exposure time. Where the cable W is located inside the optical measurement volume DCPv can be calculated by means of a simple triangulation with two shadow edges as shown in FIG. 10. With the aid of the cable position, a correction of the output signals of the second sensor array C4 can be made for the respective wavelength of the object W by interpolation between intensity correction values determined empirically in the measurement volume DCPv.

For the location-dependent compensation of the measured values, preferably the first optical measurement system D for the diameter measurement is combined with two further light sources P1a and P1b of the third illumination arrangement P1 to form a third, virtual optical measurement system P for determining the position of the object W within the disk-shaped measurement volume DCPv. This third optical measurement system P uses at least the two light sources P1a, P1b of the third illumination arrangement P1 or the first illumination arrangement DP1 together with a light source of the third illumination arrangement P1 as well as the first linear sensor array DP4.

Alternatively, one of the light sources, in particular the light source of the illumination arrangement DP1 can be combined with an additional light source when the diameter measurement is provided alone. Only a spacing of the light sources used in the circumferential direction of the cable jacks 4a, 4b or the disk-shaped optical measurement volume DCPv is important here. These two light sources yield different-angle shadowings S1, S2 whose spacing is determined with the aid of the first sensor array DP4 and on the basis of the known geometrical relationships can be converted into location information for the object W inside the cable jacks 4a, 4b or the inductive measurement volume Ev and also the optical measurement volume DCPv.

A specific design example of the geometrical optics of one embodiment of the sensor arrangement according to the invention for detecting cable colour is presented hereinafter.

Figure 11:
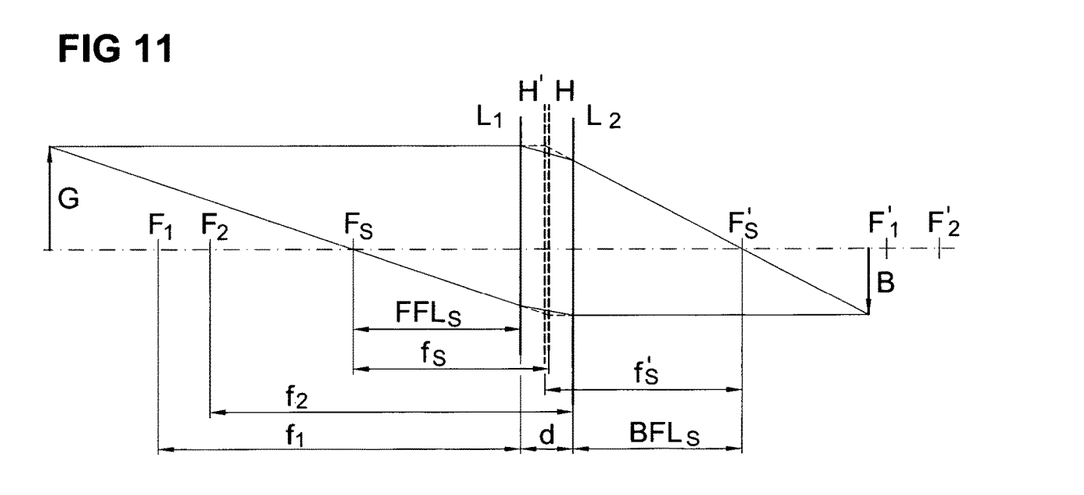
FIG. 11 shows the optical relationships of a sensor arrangement with a double lens system.

FIG. 11 shows a double lens system with two identical lenses $L_1$ and $L_2$, their appurtenant focal points $F_1$ and $F_2$, their respective focal widths $f_1$ and $f_2$, the object to be imaged G and the image B. The lenses $L_1$ and $L_2$ are located at a distance d from one another. In order to simplify the beam path and the optical calculations, the double lens system can be replaced by a single lens with its principal planes H and H' and its appurtenant system focal points $F_S$ and $F_S'$. The distance from $F_S$ to $L_1$ is also called $FFL_S$ (front focal length) and the distance from $F_S'$ to $L_2$ $BFL_S$ (back focal length).

Here it holds that:

$$\frac{1}{FFL_s} = \frac{1}{f_1} + \frac{1}{f_2 - d} \quad 1)$$

$$FFL_s = \frac{f_1(f_2 - d)}{(f_1 + f_2) - d} \quad 2)$$

$$\frac{1}{BFL_s} = \frac{1}{f_2} + \frac{1}{f_1 - d} \quad 3)$$

$$BFL_s = \frac{f_2(f_1 - d)}{(f_1 + f_2) - d} \quad 4)$$

$$\frac{1}{f_s} = \frac{1}{f_1} + \frac{1}{f_2} - \frac{d}{f_1 f_2} \quad 5)$$

$$f_s = \frac{1}{\frac{1}{f_1} + \frac{1}{f_2} - \frac{d}{f_1 f_2}} = \frac{f_1 f_2}{f_1 + f_2 - d} \quad 6)$$

Figure 12:
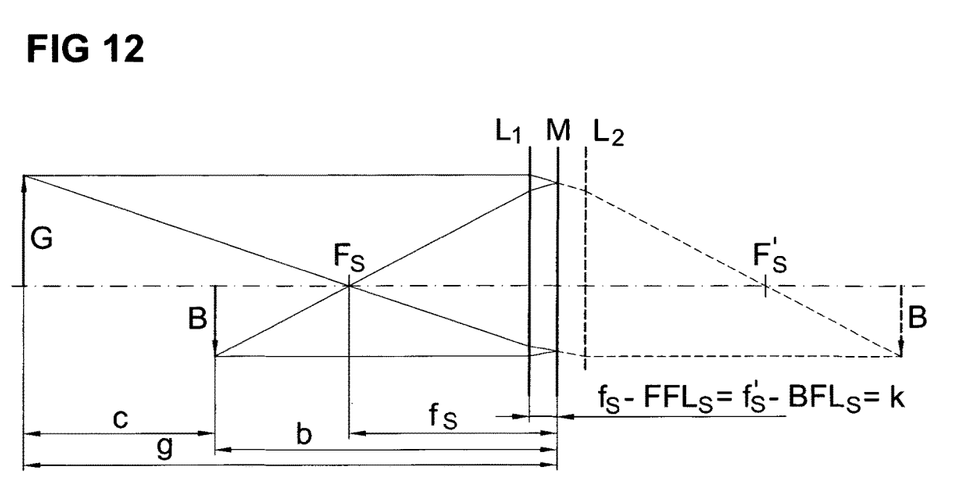
FIG. 12 shows the optical relationships of a sensor arrangement with a double lens system with mirrors.

FIG. 12 shows the double lens system when a mirror M is placed in the principal plane H. This has the effect that image B can be projected on the object side and $L_2$ omitted since $L_1$ additionally also takes on the function of $L_2$. FIG. 12 therefore schematically shows the optical situation in the optical measurement system C explained above for the cable colour, as is shown most clearly in FIGS. 2 and 3. The reflecting long-pass filter C3 corresponds to the mirror M and the lenses $L_1$ or $L_2$ correspond to the collimating lens DCP2.

With the wedge-shaped pipe piece of the optical system DCP5 in FIG. 1 between mirror M and lens $L_1$, the distance k=6.575 mm between M and $L_1$ is given. With reference to FIG. 11 and FIG. 12, the distance d between the lenses $L_1$ and $L_2$ can be calculated as follows:

$$k = f_s(d) - FFL_s(d) \quad 7)$$

$$k = \frac{f_1 f_2}{f_1 + f_2 - d} - \frac{f_1(f_2 - d)}{(f_1 + f_2) - d} \quad 8)$$

$$k = \frac{f^2}{2f - d} - \frac{f^2 - fd}{2f - d} \quad 9)$$

$$(2f - d)k = fd \quad 10)$$

$$fd + kd = 2fk \quad 11)$$

$$d = \frac{2fk}{f + k} \quad 12)$$

$$d = \frac{2 \cdot 71 \cdot 6.575}{71 + 6.575} = 12.035 \quad 13)$$

Using formula 6 and for f=71 mm, the system focal width $F_S$ will now be calculated:

$$f_s = \frac{71 \cdot 71}{71 + 71 - 12.035} = 38.787 \quad 14)$$

In the design (FIG. 1, FIG. 1 and FIG. 3), a c value (distance from the object G to the image B, i.e. from the longitudinal axis x to the second sensory array C4) of 33.5 mm was obtained. The question now arises as to how large the distances b (sensor—mirror) and g (longitudinal axis x—mirror C3) must be so that a sharp image is obtained at the second sensor array C4.

This is obtained as follows (where c=33.5 mm):

$$\frac{1}{f_s} = \frac{1}{g} + \frac{1}{b} \quad (15)$$

$$g = c + b \quad (16)$$

$$\frac{1}{f_s} = \frac{1}{c+b} + \frac{1}{b} \quad (17)$$

$$\frac{1}{f_s} - \frac{1}{b} = \frac{1}{c+b}$$

$$\frac{b - f_s}{f_s b} = \frac{1}{c+b}$$

$$(b - f_s)(c + b) = f_s b$$

$$bc + b^2 - f_s c - f_s b = f_s b$$

$$b^2 + bc - 2f_s b - f_s c = 0$$

$$b^2 + b(c - 2f_s) - f_s c = 0$$

$$b = \frac{(2f_s - c)}{2} \pm \sqrt{\frac{(c - 2f_s)^2}{4} + f_s c} \quad (18)$$

$$b = \frac{2 \cdot 38.787 - 33.5}{2} \pm \sqrt{\frac{(33.5 - 2 \cdot 38.787)^2}{4} + 38.787 \cdot 33.5} \quad (19)$$

$$b = 22.037 \pm 42.249 = 64.286$$

$$g = 33.5 + 64.286 = 97.786 \quad (20)$$

Since all the dimensions are now given, imaging scale M can be calculated.

$$M = \frac{b}{g} = \frac{B}{G} \quad (21)$$

$$M = \frac{64.286}{97.786} = 0.657 \quad (22)$$

If the second sensor array C4 is a linear sensor array having a resolution of 400 dpi and 128 pixels this gives an active sensor array length $l_{SA}$:

$$l_{SA} = \frac{25.4 \cdot 128}{400} = 8.13 \text{ mm} \quad (23)$$

A maximum object size to be imaged is thus obtained as $$G = \frac{B}{M} = \frac{l_{SA}}{M} = \frac{8.128}{0.657} = 12.37 \text{ mm} \quad (24)$$

Figure 13:
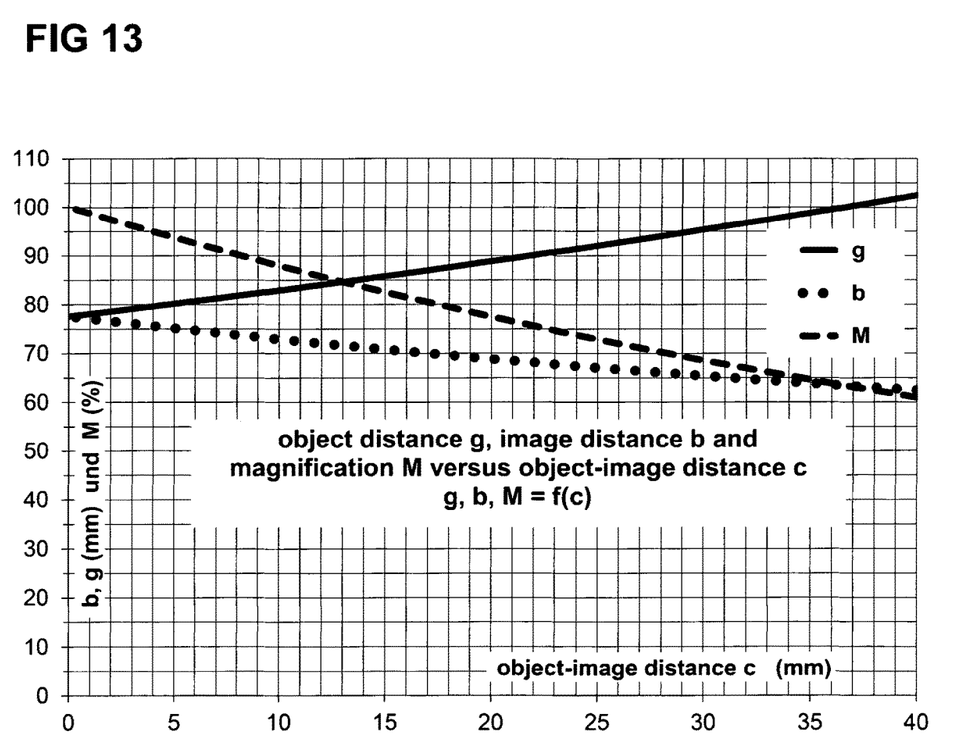
FIG. 13 shows a diagram with image width, object width and image scale as a function of the object-image distance

Using the system focal width of the lens from formula 14, as shown in FIG. 13, the image width b and the object width g can be plotted graphically as a function of the object-image distance c, i.e. the longitudinal axis x—second sensor array C4—distance for the specific exemplary embodiment using Equation 18.

Figure 14:
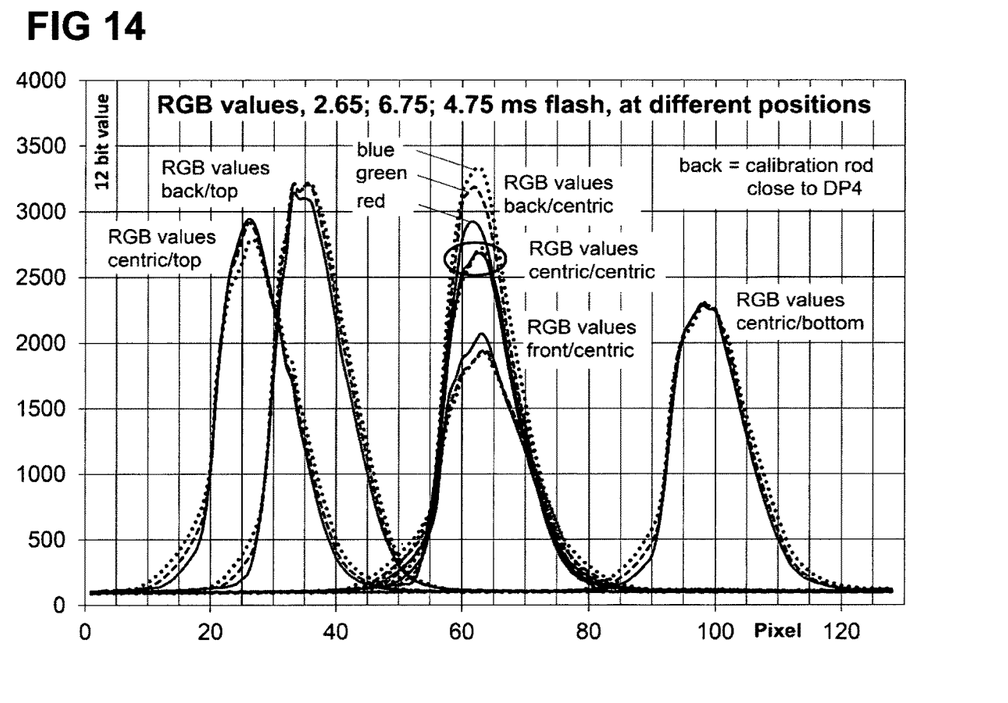
FIG. 14 shows a diagram for the white balance of a sensor arrangement and FIG. 15 shows a diagram with the measured values of an orange-coloured cable.

When the object-sensor distance c tends to 0, the imaging scale, as can be identified in FIG. 14, tends to 100%. This is the known 1/1 imaging with g=b=2*$f_S$.

Before the cable colour can be measured with the second sensor array C4, a white balance must be performed. To this end a white calibration rod is placed in the cable jacks 4a, 4b in such a manner that it lies as close as possible to the second illumination arrangement C1, so that the sensor array C4 measures the greatest brightness. The maximum allowed illumination times during illumination at the different wavelengths (red, green, blue) are adjusted so that the measured amplitudes account for about 90% of the measurement range. The calibration rod is then placed in the longitudinal axis x and the exposure times are adjusted to that the RGB integral values measured by the second sensor array C4 are all the same. In so doing, the two higher integral values are adapted to the lowest so that the previously determined maximum exposure times are not exceeded by any colour (see FIG. 14). Since the brightness of the image decreases with increasing distance between light source and object W and between object W and lens DCP2, the brightness values for the different wavelengths must be weighted according to cable position. In FIG. 14 for example, RGB measured values are plotted for six cable positions inside the cable jacks 4a, 4b: the curves designated by "centric/centric" are valid for the white calibration rod at the centre of the cable jacks 4a, 4b. If the calibration rod is located in the cable jacks 4a, 4b close to the second sensor array C4, the lines designated by "back/centric" apply. In FIG. 10 the location information back, front, bottom, top is characterized so that the measured values plotted in FIG. 10 can be correctly interpreted.

Figure 15:
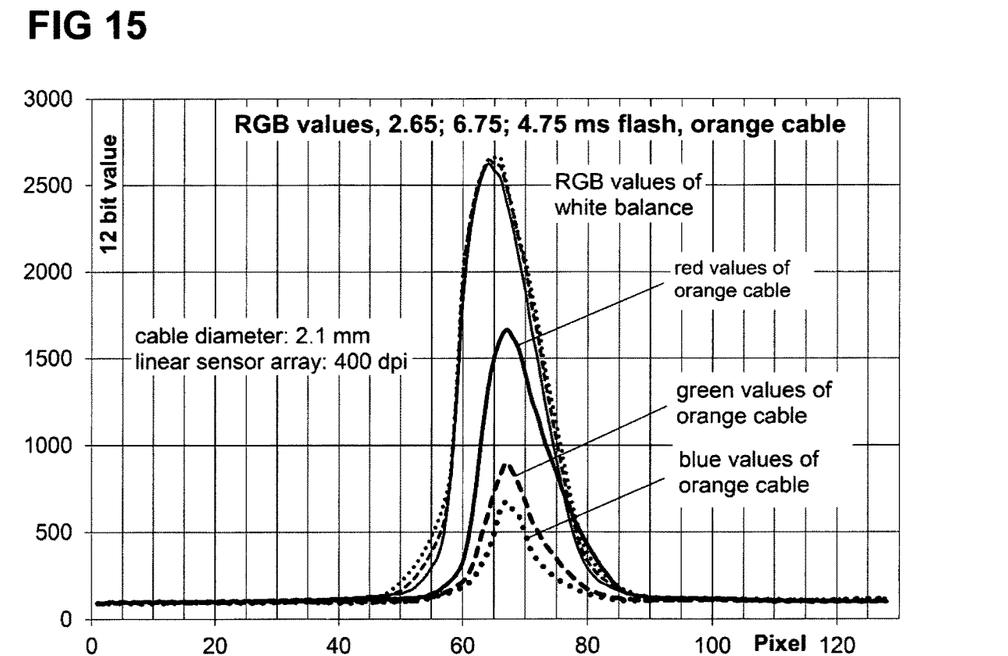

The ratio of the RGB integral values of a specific location measured with a calibration rod to the RGB integral values of the centre are colour correction values. They are dependent on location. FIG. 15 finally shows RGB measured values of an orange cable as object W at the centre of the cable jacks.

In addition to the already-mentioned advantages of the quasi-coaxial arrangement of the optical measurement systems D, C and P, whether real or virtual, such as the compact, robust, mechanical and functional synergy-using design, another advantage is that many circuit parts of the electronics such as communication interface, microcontroller, supply, LED displays and suppressor circuits can be used for all three sensors.

The greater is the focal width of the lens DCP2 for the collimation, the better is the collimation, i.e. the parallelism of the light and the more sharp-edged is the shadowing for the diameter measured. A large focal width of the lens DCP2 is also advantageous for the colour determination since then the cable-lens distance g is greater and therefore the image sharpness for the colour detection is maintained even if the object W should not run centrally through the cable jacks 4a, 4b. With increasing focal width however for the diameter measurements and also for the colour determination, the light intensity decreases which must be compensated by a longer exposure time so that for both functionalities a compromise between light intensity and image sharpness must be found.

The above-explained arrangement for the automatic detection of elongate objects using its inductive measurement system E and the purely optical measurement systems D, C, P can, if required be linked to other measurement systems. In cable processing installations, devices for cutting to length or insulating the cable are frequently provided which comprise clamping jaws and blades which can be moved with respect to one another. For such installations the measurement systems E, D, C, P can be combined with at least one further measurement system which is provided for determining the outside diameter of the object by means of a measurement of the clamping jaw spacing or for determining the diameter of an electrical conductor within the object based on a measurement of a blade spacing at the time of a blade-conductor contact. Measurement arrangements on an electrical basis, in particular by monitoring capacitive and/or inductive characteristics are sufficiently known.

The use of a temperature sensor combined with the measurement systems E, D, C, P is advantageous to compensate for temperature-induced measurement errors. In this case, preferably a correction sequence in the respective measurement system is implemented for an automated compensation in order to provide its measured value with a correction factor as a function of the temperature and with a correction factor as a function of the cable location.

The invention claimed is:

1. An arrangement for automatic contactless detection of elongate objects (W), comprising at least one inductive measuring system (E) and at least one first optical measuring system (D) for the object (W) in a common housing (2),
wherein the inductive measuring system (E) is designed as an eddy current sensor for determining an electromagnetic characteristic of the object (W) and comprises two series-connected, coaxial half-coils (E1a, E1b) which are oriented in a same direction, which have a distance from one another in an axial direction, which wind around the object (W) coaxially to a longitudinal axis (x), so that an interior thereof defines an inductive cylindrical measurement volume (Ev),
the half-coils (E1a, E1b) together with an electrically parallel connected capacitor (E2) form a parallel resonant circuit (E6) used as inductive sensor of the inductive measuring system (E), which is connected to an electronic evaluation circuit (E5), and at least one first optical measuring system (D) is formed to determine an outside diameter (Wdo) of the object (W),
an optical disk-shaped measurement volume (DCPv) is defined by spacing of the half-coils (E1a, E1b) and an inner wall of the housing (2) and is arranged inside the inductive cylindrical measurement volume (Ev).

2. The arrangement according to claim 1, wherein a length of a half-coil (E1a, E1b) is at least half as greater as a diameter thereof and the inductive cylindrical measurement volume (Ev) is restricted by cable jacks (4a, 4b).

3. The arrangement according to claim 1, wherein the parallel resonant circuit (E6) of the inductive measuring system (E) is connected to an exciter circuit (E3), operated at its natural frequency, and is connected to an electronic circuit (E5) for measuring the voltage amplitude.

4. The arrangement according to claim 1, wherein the parallel resonant circuit (E6) of the inductive measuring system (E) is connected to a frequency generator and to an electronic circuit (E5) for measuring the amplitude response and/or the phase response.

5. The arrangement according to claim 1, wherein the optical disk-shaped measurement volume (DCPv) of the first measuring system (D) is positioned in a longitudinal direction centrally and coaxially to the inductive cylindrical measurement volume (Ev) embracing the object (W).

6. The arrangement according to claim 1, wherein the first optical measuring system (D) comprises at least one first illumination arrangement (DP1) having at least one first light source (DP2) and preferably a screen (DP3) as well as a first sensor array (DP4) positioned on the other side of the half-coils (E1a, E1b) on a principal optical axis (y).

7. The arrangement according to claim 1, wherein at least a second optical measuring system (C) is formed to determine the color of the object (W).

8. The arrangement according to claim 7, wherein the second optical measuring system (C) comprises a second illumination arrangement (C1) comprising a plurality of light sources (C1a, C1b, C1c) having different wavelength spectra and at least one second sensor array (C4) for the light reflected from the object (W), and the second sensor array (C4) lies in relation to an x-z plane on a same side of the disk-shaped measurement volume (DCPv) as the second illumination arrangement (C1).

9. The arrangement according to claim 8, wherein a sequence is implemented in the second optical measuring system (C) to drive the light sources (C1a, C1b, C1c) of the second illumination arrangement (C1) in such a manner to sequentially illuminate the object (W) and thus sequentially project images in the wavelength spectra of the light sources of the second illumination arrangement onto the second sensor array (C4), wherein this is connected to an evaluation unit for the intensities measured during the illumination with the light sources of different wavelength spectra and for the ensuing determination of the color of the object (W).

10. The arrangement according to claim 8, wherein a reflecting long-pass filter (C3) is arranged on a principal optical axis (y) of the first and second optical measuring system (D, C), which is reflecting for the wavelength spectra of the second illumination arrangement (C1) and transmitting for that of the first illumination arrangement (DP1) and which deflects light reflected by the object (W) onto the second sensor array (C4) positioned outside the principal optical axis (y) and aligned towards the long-pass filter (C3).

11. The arrangement according to claim 7, wherein a lens (DCP2) is arranged between the disk-shaped measurement volume (DCPv) and the long-pass filter (C3), which is passed once as a collimating lens (DCP2) by the light of the first illumination arrangement (DP1) and also twice as an imaging lens (DCP2) by the light of the second illumination arrangement (C1) reflected by the object (W).

12. The arrangement according to claim 7, wherein the optical measuring systems (D) for determining the diameter (C) and for determining the color of the object (W) are combined to form a third virtual measuring system (P) for determining a position of the object (W) inside the disk-shaped measurement volume (DCPv).

13. The arrangement according to claim 1, wherein a principal plane (y-z) of the first, second and third optical measuring system (D, C, P) with a principal optical axis (y) is arranged perpendicular to the longitudinal axis (x) of the inductive cylindrical measurement volume (Ev).

14. The arrangement according to claim 12, wherein the third measuring system (P) comprises a third illumination arrangement (P1) with two light sources (P1a, P1b), the first sensor array (DP4) and the first illumination arrangement (DP1) for triangulatory determination of a position of the object (W) inside the disk-shaped measurement volume (DCPv).

15. The arrangement according to claim 14, wherein the third illumination arrangement (P1) comprises a plurality of light sources each having different wavelength spectra and designed to illuminate the object (W) sequentially and thus sequentially project an image in the wavelength spectra of the light sources onto the second sensor array (C4).

16. The arrangement according to claim 6, wherein the measurement plane of the first sensor array (DP4) runs perpendicular to an x-y plane but intersects this at a small angle ($\alpha$) to an x axis.

17. The arrangement according to claim 8, wherein the second sensor array (C4) is a multichromatic sensor and the light sources (C1e, C1b and C1c) of the second illumination arrangement (C1) are one of operated simultaneously or are replaced by a wide-band or multiband second light source.

18. The arrangement according to claim 8, wherein the second sensor array (C4) is a multichromatic sensor and at least one of the light sources of the third arrangement (P1) is replaced by a wide-band or multiband light source.

19. The arrangement according to claim 1, wherein the arrangement comprises a temperature sensor (T).

20. The arrangement according to claim 1, wherein a correction sequence is implemented in the inductive measuring system (E), in order to provide its measured value with a correction factor as a function of temperature and with a correction factor as a function of a position of the object (W).

21. An installation for processing elongate objects (W), wherein the object (W) on an input side is guided through the arrangement for the automatic contactless detection of objects according to claim 1.

* * * * *